United States Patent
Yang et al.

(10) Patent No.: US 12,066,706 B2
(45) Date of Patent: Aug. 20, 2024

(54) LIQUID CRYSTAL/POLYMER COMPOSITE ELECTRICALLY CONTROLLED DIMMING FILMS AND PREPARATION METHODS THEREOF

(71) Applicant: PEKING UNIVERSITY, Beijing (CN)

(72) Inventors: Huai Yang, Beijing (CN); Xiao Wang, Beijing (CN); Lanying Zhang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 18/330,486

(22) Filed: Jun. 7, 2023

(65) Prior Publication Data
US 2023/0408857 A1    Dec. 21, 2023

Related U.S. Application Data

(63) Continuation of application No. PCT/CN2022/104274, filed on Jul. 7, 2022.

(30) Foreign Application Priority Data

Jun. 20, 2022 (CN) .......................... 202210696701.8

(51) Int. Cl.
*G02F 1/1334*     (2006.01)
*C09K 19/54*      (2006.01)
(Continued)

(52) U.S. Cl.
CPC ........ *G02F 1/13345* (2021.01); *C09K 19/544* (2013.01); *G02F 1/1341* (2013.01); *G02F 1/137* (2013.01); *G02F 2203/48* (2013.01)

(58) Field of Classification Search
None
See application file for complete search history.

(56) References Cited

U.S. PATENT DOCUMENTS

| | | | | |
|---|---|---|---|---|
| 5,523,127 A | * | 6/1996 | Ohnishi | C09K 19/544 252/299.65 |
| 2008/0014372 A1 | * | 1/2008 | Lin | C09K 19/544 349/114 |

(Continued)

FOREIGN PATENT DOCUMENTS

| | | | | |
|---|---|---|---|---|
| CN | 106773234 A | * | 5/2017 | ............. C09K 19/02 |
| CN | 106886102 A | | 6/2017 | |

(Continued)

OTHER PUBLICATIONS

First Office Action in Chinese Application No. 202210696701.8 mailed on Jul. 29, 2022, 27 pages.

(Continued)

*Primary Examiner* — Ryan Crockett
(74) *Attorney, Agent, or Firm* — METIS IP LLC

(57) ABSTRACT

A liquid crystal/polymer composite electrically controlled dimming film is provided, including a liquid crystal material, a polymer matrix, and two layers of conductive substrates. The polymer matrix is sandwiched between the two layers of conductive substrates, and the polymer matrix has a porous microstructure. The liquid crystal material is dispersed in the polymer matrix to form liquid crystal microdroplets, and the liquid crystal microdroplets have vertically oriented polymer networks. The liquid crystal/polymer composite electrically controlled dimming film has a unique composite microstructure. In this composite microstructure, the polymer matrix of the porous microstructure gives the film with good mechanical processing performance. In addition, the vertically oriented polymer networks in the liquid crystal microdroplets further reduces the orientation difficulty of liquid crystal molecules, which is conducive to reducing the driving voltage of the liquid crystal/polymer (Continued)

composite electrically controlled dimming film, and is suitable for large area processing and production.

8 Claims, 9 Drawing Sheets

(51) Int. Cl.
*G02F 1/1341* (2006.01)
*G02F 1/137* (2006.01)

(56) References Cited

U.S. PATENT DOCUMENTS

| | | | | |
|---|---|---|---|---|
| 2009/0027603 | A1* | 1/2009 | Samulski | G02F 1/133711 349/123 |
| 2016/0062157 | A1* | 3/2016 | Kim | H10K 59/50 445/24 |
| 2021/0261864 | A1* | 8/2021 | Tanabe | C09K 19/3066 |
| 2022/0066246 | A1* | 3/2022 | Wu | G02F 1/13737 |

FOREIGN PATENT DOCUMENTS

| | | |
|---|---|---|
| CN | 108663828 A | 10/2018 |
| CN | 110256811 A | 9/2019 |
| CN | 110596961 A | 12/2019 |
| CN | 112375168 A | 2/2021 |
| CN | 114779516 A | 7/2022 |
| JP | 2004175949 A | 6/2004 |

OTHER PUBLICATIONS

Wenbo Shen et al., A Facile Route Towards Controllable Electric-Optical Performance of Polymer-Dispersed Liquid Crystal Via the Implantation of Liquid Crystalline Epoxy Network in Conventional Resin, Polymer, 167, 67-77, 2019.

Mohsin Hassan Saeed et al., Recent Advances in The Polymer Dispersed Liquid Crystal Composite and Its Applications, Molecules, 2020, 22 pages.

* cited by examiner

Referred to as E4M

Referred to as S4M

Referred to as 651

Referred to as DMP-30

Referred to as UV6976

LIQUID CRYSTAL/POLYMER COMPOSITE ELECTRICALLY CONTROLLED DIMMING FILMS AND PREPARATION METHODS THEREOF

CROSS-REFERENCE TO RELATED DISCLOSURES

This application is a continuation of International Application No. PCT/CN2022/104274, filed on Jul. 7, 2022, which claims priority to Chinese Patent Application No. 202210696701.8, filed on Jun. 20, 2022, the contents of each of which are incorporated herein by reference.

TECHNICAL FIELD

The present disclosure relates to the field of optical films, and specifically to liquid crystal/polymer composite electrically controlled dimming films and preparation methods.

BACKGROUND

Among the practical application of liquid crystals, there are two major fields, one is display screen and the other is optical films. In the process of preparing optical films, composite material films can be prepared by combing liquid crystals and polymer materials to achieve roll-to-roll large scale processing. Based on this, the composite films combine the excellent external field response characteristics of liquid crystals and the excellent mechanical properties of polymers. At present, there are mainly two types of electrically controlled dimming films, one is the polymer dispersed liquid crystal (PDLC) film, and the other is the polymer stabilized liquid crystal (PSLC) film.

In the PDLC film, liquid crystals are dispersed in the polymer matrix in a form of droplets. As a dimming film, the PDLC film has been on the market for many years, and there are companies producing and selling the film in the United States, Japan, and China. The PDLC film usually presents a light scattering state due to the refractive index mismatch of the polymer matrix and the unoriented liquid crystals, as well as the refractive index mismatch of the liquid crystal molecules themselves. When applied with an appropriate electric field, the film may show a state of light transmission, that is, a transparent state, due to the fact that the liquid crystal molecules form a vertical orientation under the electric field and the liquid crystal microregion is transparent, while the refractive index of the liquid crystal molecules matches that of the polymer matrix when observed along a long axis of the liquid crystal molecules. The film is mainly prepared by mixing the non-liquid crystal polymerizable monomer and liquid crystals to obtain a homogeneous mixture solution, and sandwiching the mixture solution between two layers of Indium Tin Oxide (ITO) conductive plastic films, and then initiating the polymerization of photopolymerizable monomers or thermally polymerizable monomers through irradiation of ultraviolet light or heating. Based on this, the phase separation structure of the polymer matrix and the liquid crystals is formed. The liquid crystals are dispersed in the polymer matrix in the form of microdroplets, and the polymer matrix has a porous microstructure (as shown in FIG. 1). At present, the PDLC film has a broad application prospect in many fields, such as architectural and automotive doors and windows, architectural partitions, smart anti-peep, projection screens, and touch screens.

The PDLC system generally has a high amount of the polymer matrix such as at least 10%, higher than 40%, which makes the PDLC film have a high peeling strength between the two substrates to achieve roll-to-roll continuous processing of the film. However, the driving voltage of the PDLC film is high due to the polymer matrix boundary has the strong binding effect on the liquid crystal molecules. The driving voltage of commercial PDLC films is usually above 60 volts, which limits the application of PDLC films in fields such as display.

Polymer stabilized liquid crystal film material is a film material that can stabilize a certain orientation of liquid crystal molecules, or a film material that has a tendency to make liquid crystal molecules form a certain orientation. The film material with polymer networks is generally prepared by mixing liquid crystalline polymerizable monomers with liquid crystals, and initiates the polymerization of liquid crystalline polymerization monomers through irradiation of ultraviolet light or heating, etc. The arrangement of the polymer networks is the same as the orientation of liquid crystal molecules to stabilize the orientation of liquid crystal molecules or tend to make liquid crystal molecules form a certain orientation. For example, the PSLC film with planar oriented polymer networks can be prepared by mixing liquid crystalline polymerizable monomers with cholesteric liquid crystals, performing a planar orientation treatment, and polymerizing. The PSLC film with vertically oriented polymer networks (as shown in FIG. 2) can be prepared by mixing liquid crystalline polymerizable monomers and nematic liquid crystals, performing a vertical orientation treatment, and polymerizing.

The driving voltage of the PSLC film is relatively low such as several volts. Therefore, the PSLC film has been widely applied in the field of some functional liquid crystal devices. However, the amount of polymer networks in the PSLC film is usually low such as below 10%, resulting in a low peeling strength between the two substrates of the PSLC film, which makes it difficult to make the film on flexible substrates with a larger area, thus limiting the application scope of the PSLC film. Although the PSLC material with a high amount of the polymer network can be prepared, the PSLC material has a single function, such as the inability of using electric field to drive, which limits its application.

Therefore, it is necessary to provide liquid crystal/polymer composite electrically controlled dimming films and preparation methods, such that the dimming film has both the mechanical processing performance of the PDLC film and the low driving voltage of the PSLC film.

SUMMARY

One aspect of embodiments of the present disclosure provides a liquid crystal/polymer composite electrically controlled dimming film. The liquid crystal/polymer composite electrically controlled dimming film may include a liquid crystal material, a polymer matrix, and two layers of conductive substrates. The polymer matrix may be sandwiched between the two layers of conductive substrates, and the polymer matrix may have a porous microstructure. The liquid crystal material may be dispersed in the polymer matrix to form liquid crystal microdroplets, and the liquid crystal microdroplets may have vertically oriented polymer networks.

In some embodiments, the polymer matrix may be prepared by photopolymerization of a first polymerizable monomer, and the first polymerizable monomer may be a radical photopolymerizable monomer or a cationic photopolymerizable monomer. The polymer networks may be prepared by thermal polymerization of a second polymerizable monomer, the second polymerizable monomer may be capable of aligning with molecules of the liquid crystal material along a direction of an electric field, and the second polymerizable monomer may be a rod-shaped thermally polymerizable monomer, or the second polymerizable monomer may be a combination of a rod-shaped thermally polymerizable monomer and a thermally polymerizable monomer.

In some embodiments, the polymer matrix may be prepared by photopolymerization of a first polymerizable monomer, and the first polymerizable monomer may be a radical photopolymerizable monomer or a cationic photopolymerizable monomer. The polymer networks may be prepared by photopolymerization of a second polymerizable monomer, the second polymerizable monomer may be capable of aligning with molecules of the liquid crystal material along a direction of an electric field, and the second polymerizable monomer may be one of: a rod-shaped radical photopolymerizable monomer, a rod-shaped cationic photopolymerizable monomer, a combination of a radical photopolymerizable monomer and the rod-shaped radical photopolymerizable monomer, a combination of the radical photopolymerizable monomer and the rod-shaped cationic photopolymerizable monomer, a combination of a cationic photopolymerizable monomer and the rod-shaped radical photopolymerizable monomer, or a combination of the cationic photopolymerizable monomer and the rod-shaped cationic photopolymerizable monomer.

In some embodiments, the polymer matrix may be prepared by thermal polymerization of a first polymerizable monomer, and the first polymerizable monomer may be a thermally polymerizable monomer. The polymer networks may be prepared by photopolymerization of a second polymerizable monomer, the second polymerizable monomer may be capable of aligning with molecules of the liquid crystal material along a direction of an electric field, and the second polymerizable monomer may be one of: a rod-shaped radical photopolymerizable monomer, a rod-shaped cationic photopolymerizable monomer, a combination of a radical photopolymerizable monomer and the rod-shaped radical photopolymerizable monomer, a combination of the radical photopolymerizable monomer and the rod-shaped cationic photopolymerizable monomer, a combination of a cationic photopolymerizable monomer and the rod-shaped radical photopolymerizable monomer, or a combination of the cationic photopolymerizable monomer and the rod-shaped cationic photopolymerizable monomer.

In some embodiments, the polymer matrix may be prepared by thermal polymerization of a first polymerizable monomer, and the first polymerizable monomer may be a thermally polymerizable monomer. The polymer networks may be prepared by thermal polymerization of a second polymerizable monomer, the second polymerizable monomer may be capable of aligning with molecules of the liquid crystal material along a direction of an electric field, and the second polymerizable monomer may be a rod-shaped thermally polymerizable monomer, or the second polymerizable monomer may be a combination of the rod-shaped thermally polymerizable monomer and a thermally polymerizable monomer.

In some embodiments, the radical photopolymerizable monomer may be one or more of acrylate monomers or vinyl monomers that is capable of being radically polymerized under irradiation of ultraviolet light. The cationic photopolymerizable monomer may be one or more of vinyl monomers, vinyl ether monomers, and epoxy monomers that is capable of being cationic polymerized under the irradiation of ultraviolet light. The rod-shaped radical photopolymerizable monomer may be one or more of rod-shaped acrylate monomers or rod-shaped vinyl monomers that is capable of being radically polymerized under the irradiation of ultraviolet light. The rod-shaped cationic photopolymerizable monomer may be one or more of rod-shaped epoxy monomers, rod-shaped vinyl ether monomers, and rod-shaped vinyl monomers that is capable of being cationic polymerized under the irradiation of ultraviolet light. The thermally polymerizable monomer may be a mixture of epoxy monomers and thiols or amine monomers that is capable of being thermally polymerized under a heating condition, or a mixture of monomers containing an amino, a hydroxyl, a carboxyl, or a mercapto and isocyanate monomers. The rod-shaped thermally polymerizable monomer may be a mixture of the rod-shaped epoxy monomers and rod-shaped thiol monomers or rod-shaped amine monomers that is capable of being thermally polymerized under the heating condition, or a mixture of rod-shaped monomers containing the amino, the hydroxyl, the carboxyl, or the mercapto and rod-shaped isocyanate monomers.

In some embodiments, the liquid crystal material may be a cholesteric liquid crystal material with positive dielectric anisotropy, a nematic liquid crystal, a smectic liquid crystal, or a liquid crystal material with a smectic phase-cholesteric phase transformation characteristic.

In some embodiments, the liquid crystal material may include one or more of a molecular structure (1):

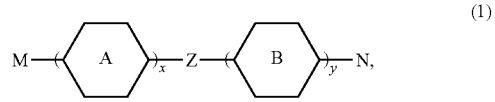

where M and N are alkyl groups containing 1-20 carbon atoms, alkoxy groups containing 1-20 carbon atoms, siloxane group containing 1-20 carbon atoms, cyan group, ester group, halogen, isothiocyano group, or nitro group. A and B are aromatic rings or alicyclic alkane containing at least one of a benzene ring, a six-membered ring, a six-membered heterocyclic ring, a five-membered ring, a five-membered heterocyclic ring, a biphenyl, a terphenyl, a naphthalene ring. A and B are connected by a covalent bond or a linking group Z. A and B contain side groups or do not contain side groups, and the side groups are halogen, cyan group, or methyl. X and y are values within a range of 0-4. Z is an ester group, an alkynyl group, an alkane group, a nitrogen-nitrogen double bond, or an ether bond.

In some embodiments, a pore size of a micropore in the polymer matrix may be within a range of 0.1 micron-100 microns.

In some embodiments, the conductive substrate includes a conductive film or a glass substrate containing metal compounds including Indium tin oxide (ITO), silver, and aluminum.

One aspect of embodiments of the present disclosure provides a liquid crystal/polymer composite electrically controlled dimming film preparation method. The method may include mixing a liquid crystal material, a first polymerizable monomer, a second polymerizable monomer, a first initiator, a second initiator, and a spacer particle to obtain a homogeneous mixture. The method may include filling the mixture between two layers of laminated conductive substrates to prepare a film, forming a polymer matrix with a porous microstructure through a first reaction, and dispersing the liquid crystal material in the polymer matrix in a form of liquid crystal microdroplets. The method may further include applying an electric field to the film to vertically align molecules of the liquid crystal material and molecules of the second polymerizable monomer, and forming vertically oriented polymer networks in the liquid crystal microdroplets through a second reaction to obtain liquid crystal/polymer composite electrically controlled dimming film.

In some embodiments, the first reaction may include the first initiator initiating photopolymerization of the first polymerizable monomer, the first polymerizable monomer may be a radical photopolymerizable monomer or a cationic photopolymerizable monomer. The second reaction may be include the second initiator initiating thermal polymerization of the second polymerizable monomer, the second polymerizable monomer may be capable of aligning with molecules of the liquid crystal material along a direction of an electric field, and the second polymerizable monomer may be a rod-shaped thermally polymerizable monomer, or the second polymerizable monomer may be a combination of the rod-shaped thermally polymerizable monomer and a thermally polymerizable monomer.

In some embodiments, the first reaction may include the first initiator initiating photopolymerization of the first polymerizable monomer, and the first polymerizable monomer may be a radical photopolymerizable monomer or a cationic photopolymerizable monomer. The second reaction may include the second initiator initiating photopolymerization of the second polymerizable monomer, the second polymerizable monomer may be capable of aligning with molecules of the liquid crystal material along a direction of an electric field, and the second polymerizable monomer may be one of: a rod-shaped radical photopolymerizable monomer, a rod-shaped cationic photopolymerizable monomer, a combination of a radical photopolymerizable monomer and the rod-shaped radical photopolymerizable monomer, a combination of the radical photopolymerizable monomer and the rod-shaped cationic photopolymerizable monomer, a combination of a cationic photopolymerizable monomer and the rod-shaped radical photopolymerizable monomer, or a combination of the cationic photopolymerizable monomer and the rod-shaped cationic photopolymerizable monomer.

In some embodiments, the first reaction may include the first initiator initiating thermal polymerization of the first polymerizable monomer, and the first polymerizable monomer may be a thermally polymerizable monomer. The second reaction may include the second initiator initiating photopolymerization of the second polymerizable monomer, the second polymerizable monomer may be capable of aligning with molecules of the liquid crystal material along a direction of an electric field, and the second polymerizable monomer may be one of: a rod-shaped radical photopolymerizable monomer, a rod-shaped cationic photopolymerizable monomer, a combination of a radical photopolymerizable monomer and the rod-shaped photopolymerizable monomer, a combination of the radical photopolymerizable monomer and the rod-shaped cationic photopolymerizable monomer, a combination of a cationic photopolymerizable monomer and the rod-shaped radical photopolymerizable monomer, or a combination of the cationic photopolymerizable monomer and the rod-shaped cationic photopolymerizable monomer.

In some embodiments, the first reaction may include the first initiator initiating thermal polymerization of the first polymerizable monomer, and the first polymerizable monomer may be a thermally polymerizable monomer. The second reaction may include the second initiator initiating thermal polymerization of the second polymerizable monomer, the second polymerizable monomer may be capable of aligning with molecules of the liquid crystal material along a direction of an electric field, and the second polymerizable monomer may be a rod-shaped thermally polymerizable monomer, or the second polymerizable monomer may be a combination of the rod-shaped thermally polymerizable monomer and a thermally polymerizable monomer.

In some embodiments, the radical photopolymerizable monomer may be one or more of acrylate monomers or vinyl monomers that is capable of being radically polymerized under irradiation of ultraviolet light. The cationic photopolymerizable monomer may be one or more of vinyl monomers, vinyl ether monomers, and epoxy monomers that is capable of being cationic polymerized under the irradiation of ultraviolet light. The rod-shaped radical photopolymerizable monomer may be one or more of rod-shaped acrylate monomers or rod-shaped vinyl monomers that is capable of being radically polymerized under the irradiation of ultraviolet light. The rod-shaped cationic photopolymerizable monomer may be one or more of rod-shaped epoxy monomers, rod-shaped vinyl ether monomers, and rod-shaped vinyl monomers that is capable of being cationic polymerized under the irradiation of ultraviolet light. The thermally polymerizable monomer may be a mixture of epoxy monomers and thiols or amine monomers that is capable of being thermally polymerized under a heating condition, or a mixture of monomers containing an amino, a hydroxyl, a carboxyl, or a mercapto and isocyanate monomers. The rod-shaped thermally polymerizable monomer may be a mixture of the rod-shaped epoxy monomers and rod-shaped thiol monomers or rod-shaped amine monomers that is capable of being thermally polymerized under the heating condition, or a mixture of rod-shaped monomers containing the amino, the hydroxyl, the carboxyl, or the mercapto and rod-shaped isocyanate monomers.

In some embodiments, the liquid crystal material, the first polymerizable monomer, and the second polymerizable monomer may be 10.0-95.0 parts by weight, 5.0-80.0 parts by weight, and 0.1-40.0 parts by weight, respectively.

BRIEF DESCRIPTION OF THE DRAWINGS

The present disclosure may be further illustrated by way of exemplary embodiments, which may be described in detail with the accompanying drawings. These embodiments are not limiting, and in these embodiments, the same number indicates a similar structure, wherein.

DETAILED DESCRIPTION

Figure 1:
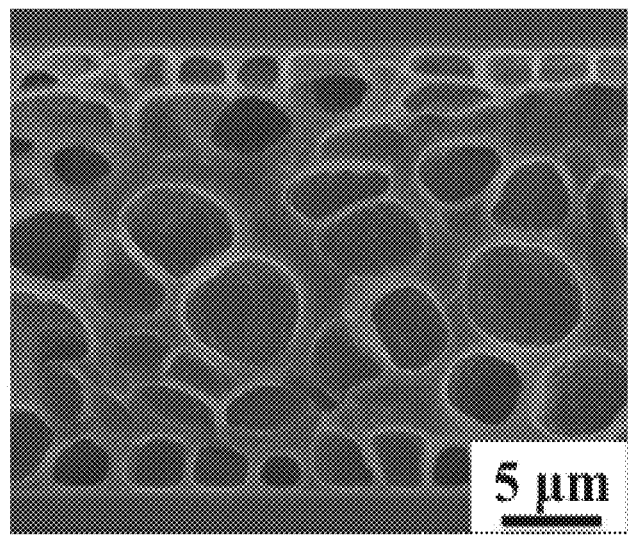
FIG. 1 is a scanning electron microscopy photo illustrating the porous polymer matrix of PDLC of prior art.
Figure 2:
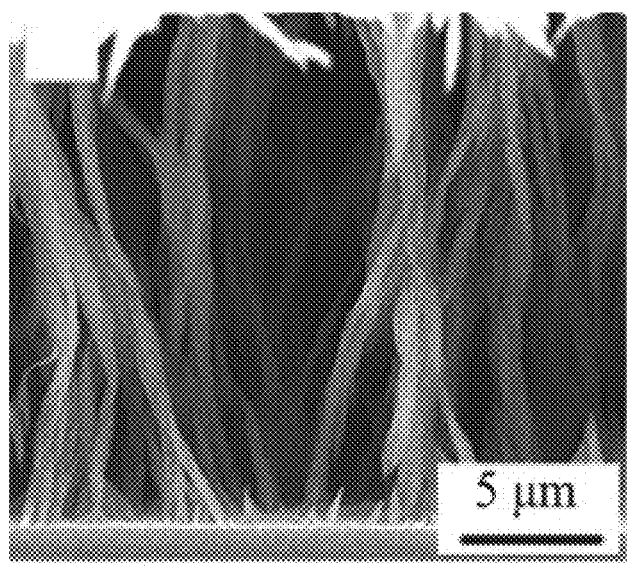
FIG. 2 is a scanning electron microscopy photo illustrating vertically oriented polymer networks of PSLC of prior art.

In order to more clearly illustrate the technical solutions of the embodiments of the present disclosure, the following may briefly introduce the drawings that need to be used in the description of the embodiments. Obviously, the drawings in the following description are only some examples or embodiments of the present disclosure. For those of ordinary skill in the art, without creative work, the present disclosure can be applied to other similar scenarios according to these drawings. It should be understood that these exemplary embodiments are given only to enable those skilled in the relevant art to better understand and realize the present invention, but not to limit the scope of the present disclosure in any way. Unless it is obvious from the language environment or otherwise stated, the same reference numbers in the drawings represent the same structure or operation.

Some embodiments of the present disclosure provide a liquid crystal/polymer composite electrically controlled dimming film. The liquid crystal/polymer composite electrically controlled dimming film may include two layers of laminated conductive substrates. Each layer of the conductive substrates may include a conductive film or a glass substrate containing metal compounds such as ITO, silver, and aluminum. A polymer matrix with a porous microstructure may be sandwiched between the two layers of the conductive substrates and the pore size of the porous microstructure may be within a range of 0.1 microns-100 microns. A liquid crystal material may be dispersed in the porous microstructure of the polymer matrix in the form of liquid crystal microdroplets, and vertically oriented polymer networks may be formed in the liquid crystal microdroplets. The vertical orientation refers to an orientation perpendicular to the conductive substrate.

In some embodiments of the present disclosure, a first step may be used to express a first reaction, and the first reaction may include a first initiator to initiate photopolymerization or thermal polymerization of the first polymerizable monomer. A second step may be used to express a second reaction, and the second reaction may include a second initiator to initiate the photopolymerization or the thermal polymerization of the second polymerizable monomer. The first step and the second step do not limit the processing order.

The polymer matrix may be prepared by the photopolymerization or the thermal polymerization of the first polymerizable monomer in the first step, and the polymer networks may be prepared by the photopolymerization or the thermal polymerization of the second polymerizable monomer in the second step, and the second polymerizable monomer may be capable of aligning with molecules of the liquid crystal material along a direction of an electric field.

In some embodiments, when the photopolymerization is adopted to prepare the polymer matrix in the first step, the first polymerizable monomer may be a radical photopolymerizable monomer or a cationic photopolymerizable monomer.

In some embodiments, when the thermal polymerization is adopted to prepare the polymer matrix in the first step, the first polymerizable monomer may be a thermally polymerizable monomer.

In some embodiments, the second polymerizable monomer may include a rod-shaped monomer. In some embodiments, a geometric shape of the rod-shaped monomer may be rod shape with different length and width. An aspect ratio of the rod-shaped monomer molecule is within a range of 1.1-10. The rod-shaped monomer molecule may have a certain rigidity. Usually, there is a rigid structure at the central part of the monomer molecule, and an end of the monomer molecule may include easily polarized groups or flexible chains. In some embodiments, the rigid structure may be a conjugated system formed by a double bond, a triple bond, or a benzene ring. In some embodiments, the rigid structure may include a six-membered ring, a six-membered heterocyclic ring, a five-membered ring, a five-membered heterocyclic ring, a biphenyl, a terphenyl, a naphthalene ring, or an anthracycline. In some embodiments, the rigid structure may include a structure with a large aspect ratio formed by at least two of a six-membered ring, a six-membered heterocycle, a five-membered ring, a five-membered heterocycle, a biphenyl, a terphenyl, a naphthalene, or an anthracycline, which are linked by covalent bonds or linking groups. The linking group may include a dimethyl, an ester, a vinyl, an ethynyl, an azo, schiff base, etc. In some embodiments, the rod-shaped monomer may also have side groups, which may include a cyan group, a methoxy, a fluorine, or a chlorine. In some embodiments, the flexible chains (or the flexible tail chains) on both sides of the rod-shaped monomer molecule may be carbon chains with odd or even numbers of carbon atoms. In some embodiments, the rod-shaped monomer may include a rod-shaped radical photopolymerizable monomer, a rod-shaped cationic photopolymerizable monomer, or a rod-shaped thermally polymerizable monomer.

In some embodiments, when the photopolymerization is adopted to prepare the polymer networks in the second step, the second polymerizable monomer may be one of: a rod-shaped radical photopolymerizable monomer, a rod-shaped cationic photopolymerizable monomer, a combination of a radical photopolymerizable monomer and the rod-shaped radical photopolymerizable monomer, a combination of the radical photopolymerizable monomer and the rod-shaped cationic photopolymerizable monomer, a combination of a cationic photopolymerizable monomer and the rod-shaped radical photopolymerizable monomer, or a combination of the cationic photopolymerizable monomer and the rod-shaped cationic photopolymerizable monomer.

In some embodiments, when the thermal polymerization is adopted to prepare the polymer networks in the second step, the second polymerizable monomer may be a rod-shaped thermally polymerizable monomer, or the second polymerizable monomer may be a combination of the rod-shaped thermally polymerizable monomer and a thermally polymerizable monomer.

In some embodiments, the radical photopolymerizable monomer may be one or more of acrylate monomers and ethylenic monomers, and may be radically polymerized under the irradiation of ultraviolet light.

In some embodiments, the cationic photopolymerizable monomer may be one or more of vinyl ether monomers, epoxy monomers and vinyl monomers, and may be cationic polymerized under the irradiation of ultraviolet light.

According to different material systems, the preferred irradiation intensity and irradiation time of ultraviolet light are different. In some embodiments, the intensity of the ultraviolet light of the photopolymerization may be within a range of 0.01 mw/cm$^2$-100 mw/cm$^2$. In some embodiments, the intensity of the ultraviolet light of the photopolymerization may be within a range of 0.1 mw/cm$^2$-90 mw/cm$^2$. In some embodiments, the intensity of the ultraviolet light of the photopolymerization may be within a range of 1 mw/cm$^2$-200 mw/cm$^2$. In some embodiments, the intensity of the ultraviolet light of the photopolymerization may be within a range of 5 mw/cm$^2$-70 mw/cm$^2$. In some embodiments, the intensity of the ultraviolet light of the photopolymerization may be within a range of 10 mw/cm$^2$-60 mw/cm$^2$. In some embodiments, the intensity of the ultraviolet light of the photopolymerization may be within a range of 20 mw/cm$^2$-50 mw/cm$^2$. In some embodiments, the intensity of the ultraviolet light of the photopolymerization may be within a range of 30 mw/cm$^2$-40 mw/cm$^2$. In some embodiments, the irradiation time of the ultraviolet light of the photopolymerization may be within a range of 0.1 min-60 min. In some embodiments, the irradiation time of the ultraviolet light of the photopolymerization may be within a range of 1 min-50 min. In some embodiments, the irradiation time of the ultraviolet light of the photopolymerization may be within a range of 10 min-40 min. In some embodiments, the irradiation time of the ultraviolet light of the photopolymerization may be within a range of 20 min-30 min. In some embodiments, the intensity of the ultraviolet light of the photopolymerization may be mw/cm$^2$, and the irradiation time of the ultraviolet light of the photopolymerization may be 10 min.

In some embodiments, the thermally polymerizable monomer is a mixture of epoxy monomers and thiols or amine monomers or a mixture of rod-shaped monomers containing the amino, the hydroxyl, the carboxyl, or the mercapto and rod-shaped isocyanate monomers, and may be thermally polymerized under a heating condition.

In some embodiments, the rod-shaped radical photopolymerizable monomer may be one or more of rod-shaped acrylate monomers and rod-shaped vinyl monomers, and may be radically polymerized under the irradiation of ultraviolet light.

In some embodiments, the rod-shaped cationic photopolymerizable monomer may be one or more of rod-shaped epoxy monomers, rod-shaped vinyl ether monomers, rod-shaped vinyl monomers, and may be cationic polymerized under the irradiation of ultraviolet light.

In some embodiments, the rod-shaped thermally polymerizable monomer is a mixture of the rod-shaped epoxy monomers and rod-shaped thiol monomers or a mixture of rod-shaped monomers containing the amino, the hydroxyl, the carboxyl, or the mercapto and rod-shaped isocyanate monomers, and may be thermally polymerized under a heating condition.

In some embodiments of the present disclosure, one or more of the following structural formulas may be selected as the rod-shaped radical photopolymerizable monomer:

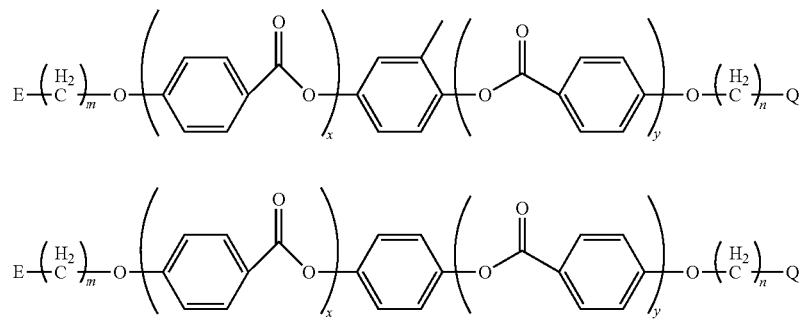

where m and n are 1-20, x and y are 1-2, E and Q are acrylate, epoxy acrylate, or ethylenic functional groups.

In some embodiments of the present disclosure, one or more of the following structural formulas may be selected as the rod-shaped cationic photopolymerizable monomer:

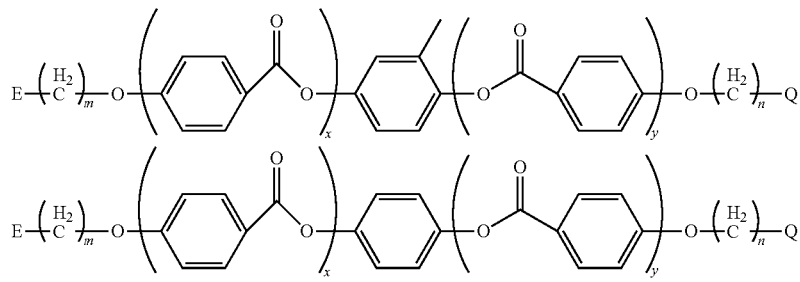

where m and n are 1-20, x and y are 1-2, E and Q are vinyl ether or epoxy functional groups.

In some embodiments of the present disclosure, one or more of the following structural formulas may be selected as the rod-shaped epoxy and the rod-shaped mercaptan monomer as rod-shaped thermal polymerization monomer:

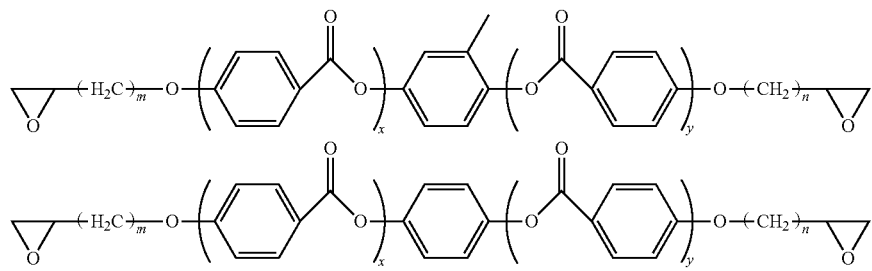

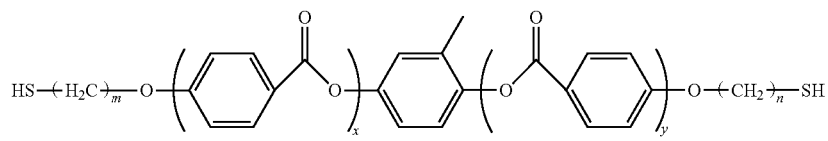

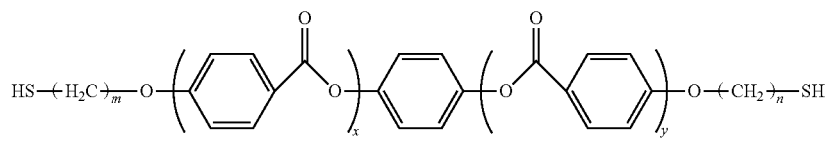

where m and n are 1-20, x and y are 1-2.

In some embodiments, the liquid crystal material may be a cholesteric liquid crystal material with positive dielectric anisotropy, a nematic liquid crystal material, a smectic liquid crystal material, and a liquid crystal material with a smectic phase-cholesteric phase transformation characteristic. The nematic liquid crystal material may include, but is not limited to, liquid crystal material sold in a market, such as SLC-1717, SLC-7011, TEB30A of Yongsheng Huaqing Liquid Crystal Material Co., ltd., E7, E44, E48, ZLI-1275, etc. of Merck Liquid Crystal Materials Company of Germany. The cholesteric liquid crystal material may be obtained by blending the nematic liquid crystal material with chiral compounds, and the chiral compounds include, but are not limited to, one or more of cholesteryl nonanoate, CB15, C15, S811, R811, S1011, R1011, etc.

In some embodiments, a molecular structure of the liquid crystal material may be as follows:

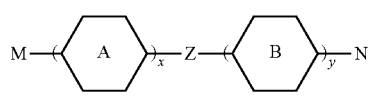

(1)

where M and N are an alkyl group containing 1~20 carbon atoms, or an alkoxy group containing 1~20 carbon atoms, a siloxane group containing 1~20 carbon atoms, a cyano group, an ester group, a halogen, an isothiocyano group, or a nitro group. A and B are aromatic rings or alicyclic alkanes, including at least one of six-membered rings, six-membered heterocyclic rings, five-membered rings, five-membered heterocyclic rings, biphenyls, terphenyls, naphthalene rings, and A and B are connected by covalent bonds or a linking groups Z. A and B contain side groups or do not contain side groups, and side groups are halogen, cyano, or methyl. x and y are 0~4 respectively. Z is the ester group, the alkynyl group, the alkane group, the nitrogen nitrogen double bond, or ether bond.

Some embodiments of the present disclosure also provide a liquid crystal/polymer composite electrically controlled dimming film preparation method, the method may include operations. 1) A liquid crystal material, a first polymerizable monomer, a second polymerizable monomer, a first initiator, a second initiator, and a spacer particle may be mixed to obtain a homogeneous mixture. 2) The mixture may be filled between two layers of laminated conductive substrates to prepare a film, a polymer matrix with a porous microstructure may be formed through a first reaction, and the liquid crystal material may be dispersed in the polymer matrix in a form of liquid crystal microdroplets. 3) An electric field may be applied to the film to vertically align molecules of the liquid crystal material and molecules of the second polymerizable monomer, and vertically oriented polymer networks may be formed in the liquid crystal microdroplets through a second reaction to obtain a liquid crystal/polymer composite electrically controlled dimming film.

The first reaction refers to a reaction used to prepare the polymer matrix. In some embodiments, the first reaction may include the first initiator initiating the photopolymerization or the thermal polymerization of the first polymerizable monomer.

The second reaction may be a reaction used to prepare the polymer networks. In some embodiments, the second reaction may include a second initiator initiating the photopolymerization or the thermal polymerization of the second polymerizable monomer.

Some embodiments of the present disclosure propose a two-step polymerization method formed by the first reaction and the second reaction (i.e., the two-step polymerization method formed by the first step and the second step) to prepare a liquid crystal/polymer composite electrically controlled dimming film, which has both the good mechanical processing properties of the PDLC films and the low driving voltage of the PSLC films. The vertically oriented polymer networks are formed in the polymer matrix by the two-step polymerization method. The polymer matrix with microstructures ensures the good mechanical processing performance of the liquid crystal/polymer composite electrically controlled dimming film. In addition, the vertically oriented polymer networks in the pores reduce the difficulty of orientation of the liquid crystal molecules under the action of an electric field, thereby reducing the driving voltage of the liquid crystal/polymer composite electrically controlled dimming film. It can be understood that the first reaction may be used to prepare the polymer matrix (i.e., the first step used to prepare the polymer matrix) and the second reaction may be used to prepare the polymer networks (i.e., the second step used to prepare the polymer networks).

The two-step polymerization method involved in some embodiments of the present disclosure may include four preparation routes, including a photo-photo two-step polymerization, a photo-thermal two-step polymerization, a thermal-photo two-step polymerization, and a thermal-thermal two-step polymerization.

The photo-photo two-step polymerization refers to that the first step adopts photopolymerization to prepare the polymer matrix, and the second step adopts photopolymerization to prepare the polymer networks. In some embodiments, when adopting the photo-photo two-step polymerization, the first polymerizable monomer may be a radical photopolymerizable monomer or a cationic photopolymerizable monomer, and the second polymerizable monomer may be one of: a rod-shaped radical photopolymerizable monomer, a rod-shaped cationic photopolymerizable monomer, a combination of the radical photopolymerizable monomer and the rod-shaped radical photopolymerizable monomer, a combination of the radical photopolymerizable monomer and the rod-shaped cationic photopolymerizable monomer, a combination of a cationic photopolymerizable monomer and the rod-shaped radical photopolymerizable monomer, or a combination of the cationic photopolymerizable monomer and the rod-shaped cationic photopolymerizable monomer.

The photo-thermal two-step polymerization refers to that the first step adopts the photopolymerization to prepare the polymer matrix, and the second step adopts the thermal polymerization to prepare the polymer networks. In some embodiments, when adopting the photo-thermal two-step polymerization, the first polymerizable monomer may be a radical photopolymerizable monomer or a cationic photopolymerizable monomer, and the second polymerizable monomer may be a rod-shaped thermally polymerizable monomer, or a combination of the rod-shaped thermally polymerizable monomer and the thermally polymerizable monomer.

The thermal-photo two-step polymerization refers to that the first step adopts the thermal polymerization to prepare the polymer matrix, and the second step adopts the photopolymerization to prepare the polymer networks. In some embodiments, when adopting the thermal-photo two-step polymerization, the first polymerizable monomer may be a thermally polymerizable monomer, and the second polymerizable monomer may be one of: a rod-shaped radical photopolymerizable monomer, a rod-shaped cationic photopolymerizable monomer, a combination of a radical photopolymerizable monomer and the rod-shaped photopolymerizable monomer, a combination of the radical photopolymerizable monomer and the rod-shaped cationic photopolymerizable monomer, a combination of a cationic photopolymerizable monomer and the rod-shaped radical photopolymerizable monomer, or a combination of the cationic photopolymerizable monomer and the rod-shaped cationic photopolymerizable monomer.

The thermal-thermal two-step polymerization refers to that the first step adopts the thermal polymerization to prepare the polymer matrix, and the second step adopts the thermal polymerization to prepare the polymer networks. In some embodiments, when adopting the thermal-thermal two-step polymerization, the first polymerizable monomer may be the thermally polymerizable monomer, and the second polymerizable monomer may be the rod-shaped thermally polymerizable monomer, or the combination of the rod-shaped thermally polymerizable monomer and the thermally polymerizable monomer.

Figure 3:
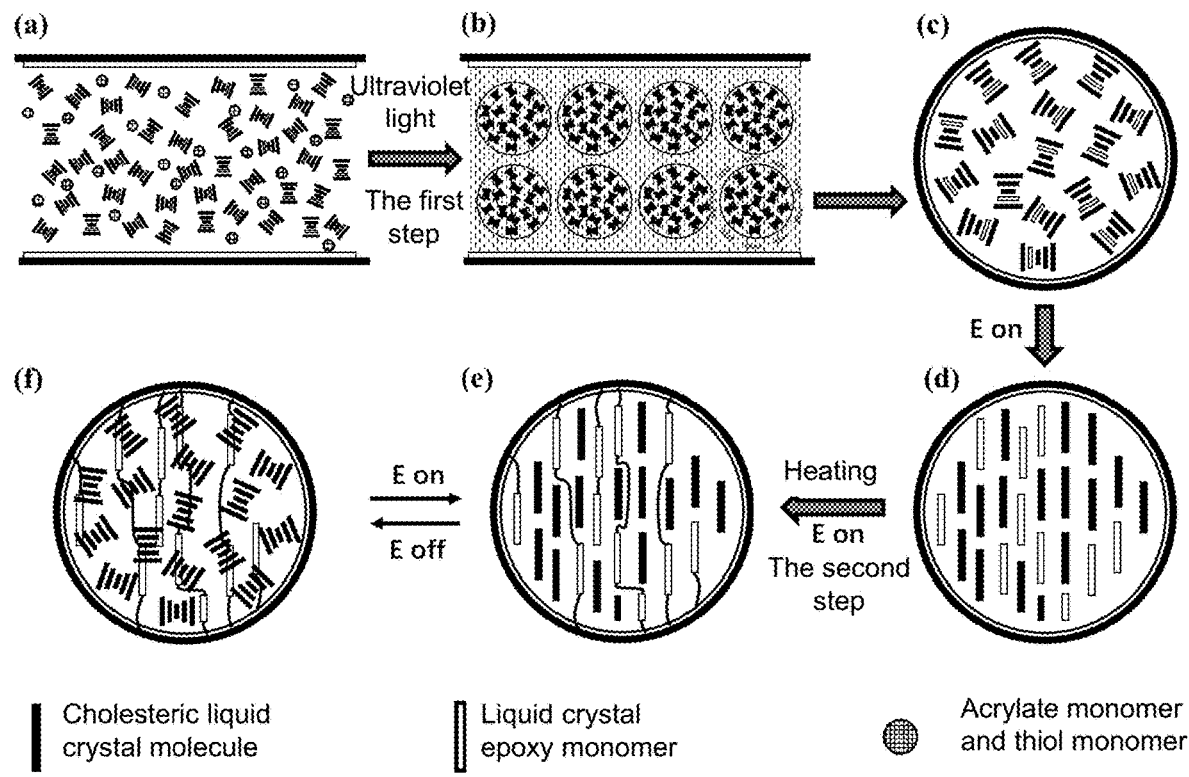
FIG. 3 is a schematic diagram illustrating preparing a polymer matrix by photopolymerization and preparing a polymer network by thermal polymerization according to some embodiments of the present disclosure.
Figure 4:
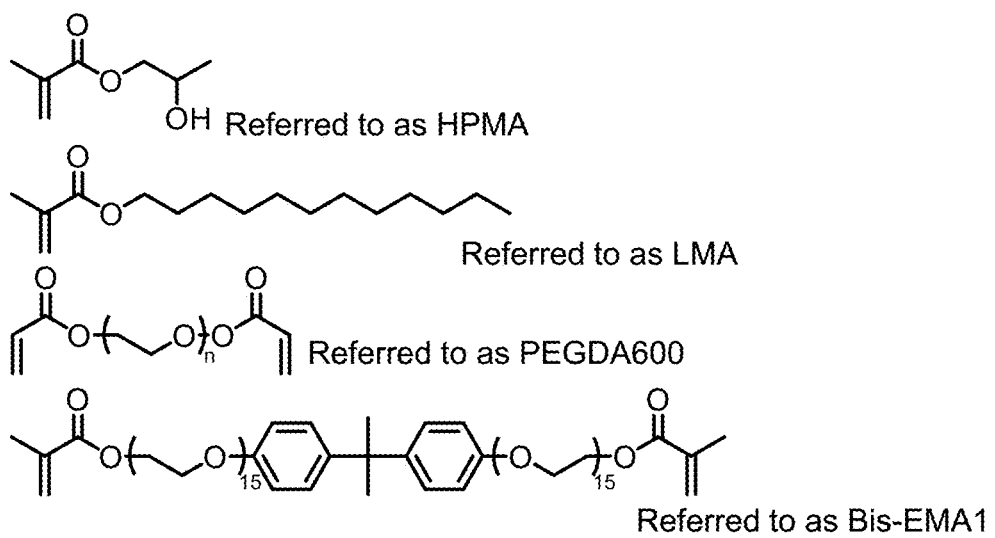
FIG. 4 is structural formulas of an acrylate monomer including a hydroxypropyl methacrylate (HPMA), a lauryl methacrylate (LMA), a polyethylene glycol diacrylate (PEGDA600), a bisphenol A ethoxylate dimethacrylate (Bis-EMA15) according to some embodiments of the present disclosure.
Figure 5:
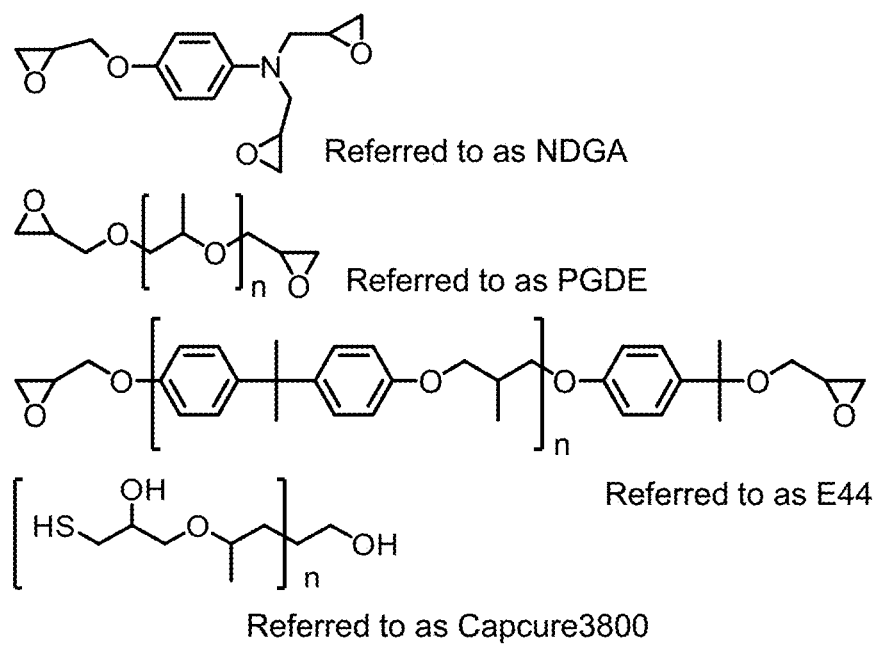
FIG. 5 is structural formulas of an epoxy monomer including a N,N'-bis(2,3-epoxypropoxy)aniline (NDGA), a polypropylene glycol diglycidyl ether (PGDE), a bisphenol A epoxy resin (E44) and a thiol monomer including a thiol monomer (Capure3800) according to some embodiments of the present disclosure.
Figure 6:
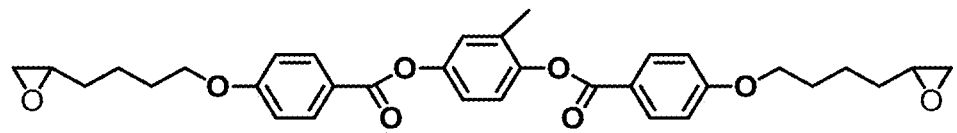
FIG. 6 is a structural formula of a rod-shaped epoxy monomer including a 2-methyl-1,4-phenylene bis(4-(4-(epoxy-2-yl)butoxy)benzoate) (referred to as E4M) according to some embodiments of the present disclosure.
Figure 7:
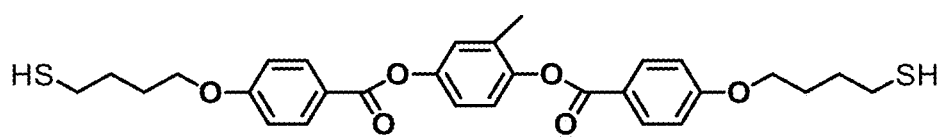
FIG. 7 is a structural formula of a rod-shaped thiol monomer including a 2-methyl-1,4-phenylenebis(4-(4-mercaptobutoxy)benzoic acid) (referred to as S4M) according to some embodiments of the present disclosure.
Figure 8:
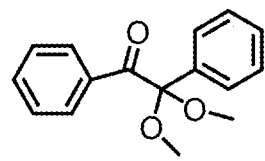
FIG. 8 is structural formulas of a photoinitiator 651, a thermal initiator DMP-30, and a cationic initiator UV6976 according to some embodiments of the present disclosure.
Figure 8:
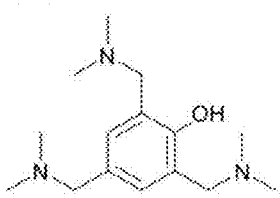
Figure 8:
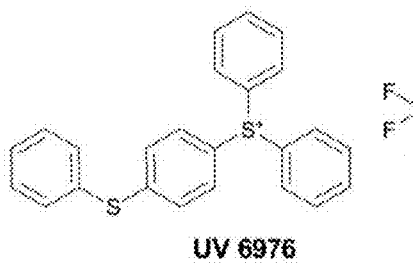

Among the four preparation routes, the technical route of the composite films prepared by the photo-thermal two-step polymerization may be shown in FIG. 3. In addition, the principle of the technical routes of the composite films prepared by the photo-photo two-step polymerization, the thermal-photo two-step polymerization, and the thermal-thermal two-step polymerization may be similar to that in FIG. 3, which are not repeated here.

In some embodiments, in the step 1, the liquid crystal material, the first polymerizable monomer, and the second polymerizable monomer may be 10.0-95.0 parts by weight, 5.0-80.0 parts by weight, and 0.1-40.0 parts by weight, respectively.

Because the vertically oriented polymer networks are confined within the pore size of the porous microstructure, the pore size of the micropores in the polymer matrix may be regulated by changing the types or proportions of the liquid crystal material, the first polymerizable monomer, and the second polymerizable monomer. Based on this, the amount and density of the vertically oriented polymer networks may be further regulated, so that liquid crystal/polymer composite electrically controlled dimming films with different driving voltages and electro-optical properties may be prepared to meet different application requirements.

In practical application, the pore size of the polymer matrix with microstructures may be different ranges, such as 0.1 micron-1 micron, 1 micron-10 microns, 10 microns-20 microns, 20 microns-40 microns, 40 microns-60 microns, 60 microns-80 microns, 80 microns-100 microns, and the corresponding vertically oriented polymer networks may also be confined within these pores. In some embodiments, the pore size of the polymer matrix with microstructures may be preferably less than 10 microns.

For the liquid crystal/polymer composite electrically controlled dimming film provided by some embodiments of the present disclosure, the liquid crystal material may be dispersed in the polymer matrix in the form of liquid crystal microdroplets, that is, the polymer matrix has the microstructure of a plurality of micropores. The polymer networks in the micro-region where the liquid crystal droplet is located make that the liquid crystal/polymer composite electrically controlled dimming film not only have the advantages of the PDLC film (i.e., excellent peeling strength and large area flexible processing), but also have the advantages of the PSLC film (i.e., excellent electro-optical properties).

In order to help those skilled in the art to further understand some technical solutions of the present disclosure, the technical solutions for preparing the liquid crystal/polymer composite electrically controlled dimming film in the present disclosure may be further described in detail below through specific embodiments.

In the following embodiments 1-3 and comparative embodiment 1, the cholesteric liquid crystal material may be selected as the mixture of commercial liquid crystal SLC1717 and chiral compound S811, and the ratio of the commercial liquid crystal SLC1717 to the chiral compound S811 is 94:6. In addition, the following embodiments 1-3 and comparative embodiment 1 are all carried out at room temperature, and abbreviations and the structural formulas of the polymerizable monomers (the first polymerizable monomer and the second polymerizable monomer), the initiator (the first initiator and the second initiator) may be shown in FIGS. 4-8.

Embodiment 1

The photo-thermal two-step polymerization is adopted in the embodiment 1. The name and proportion of the selected liquid crystal material, the first polymerizable monomer, the second polymerizable monomer, the first initiator, the second initiator, spacer particles are listed in Table 1, and the total mass of the mixture is 15 g. The materials in Table 1 are stirred at room temperature to form an isotropic liquid and are mixed evenly, and the mixture is sandwiched between two ITO conductive plastic films coated with indium tin oxide, and the mixture sandwiched between the two ITO conductive plastic film sandwiching is rolled evenly to form a film. The area of the ITO conductive plastic films is 0.4*0.4 $m^2$. The first polymerization (photopolymerization) is performed by irradiating the film using ultraviolet light with a wavelength of 365 nm at room temperature, and the intensity of the ultraviolet light is 5.0 mw/$cm^2$, and the irradiation time is 10 min. Subsequently, the second polymerization (thermal polymerization) is performed by applying a voltage of 100 V to the film, and then placing the film in an oven at 70° C. for 5 h to obtain the liquid crystal/polymer composite electrically controlled dimming film in the embodiment of the present disclosure.

Figure 9:
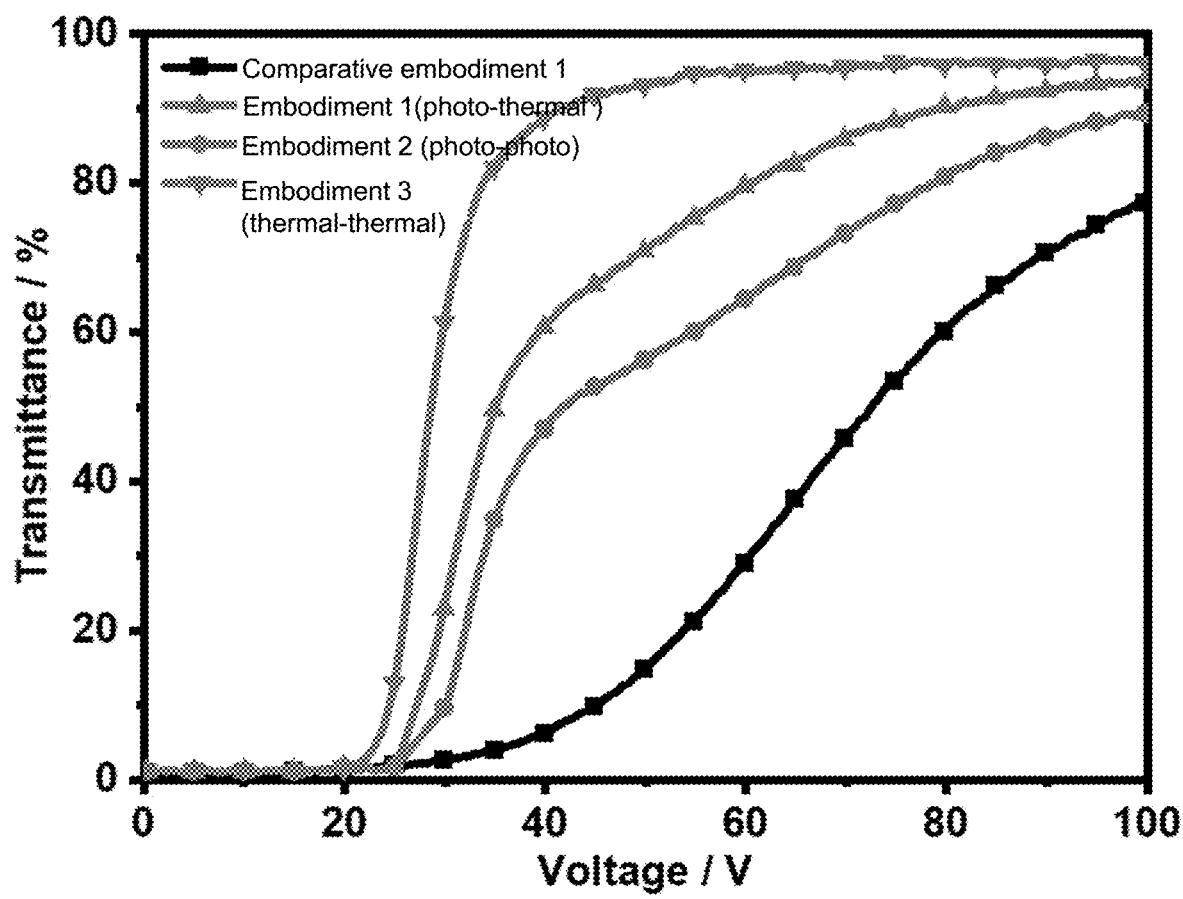
FIG. 9 is an electro-optical curve illustrating a liquid crystal/polymer composite electrically controlled dimming film according to some embodiments of the present disclosure.

The liquid crystal/polymer composite electrically controlled dimming film prepared by the embodiment 1 may be tested using a liquid crystal comprehensive tester to obtain the electro-optical curve as shown in the solid positive triangular curve in FIG. 9. The liquid crystal/polymer composite electrically controlled dimming film may be soaked in cyclohexane to remove the liquid crystal material and then dried, and a scanning electron microscopy photo of the processed liquid crystal/polymer composite electrically controlled dimming film may be shown in FIG. 10.

In FIG. 9, the abscissa is the voltage value, and the ordinate is the transmittance of the liquid crystal/polymer composite electrically controlled dimming film. As shown in FIG. 9, the solid positive triangular curve is the electro-optical curve of the liquid crystal/polymer composite electrically controlled dimming film obtained in the embodiment 1. The driving voltage of the electro-optical curve corresponding to the embodiment 1 may be about 25 V, and when the voltage is 100 V, the transmittance of the liquid crystal/polymer composite electrically controlled dimming film may be 94%. The liquid crystal/polymer composite electrically controlled dimming film obtained in the embodiment 1 may have a lower driving voltage.

Figure 10:
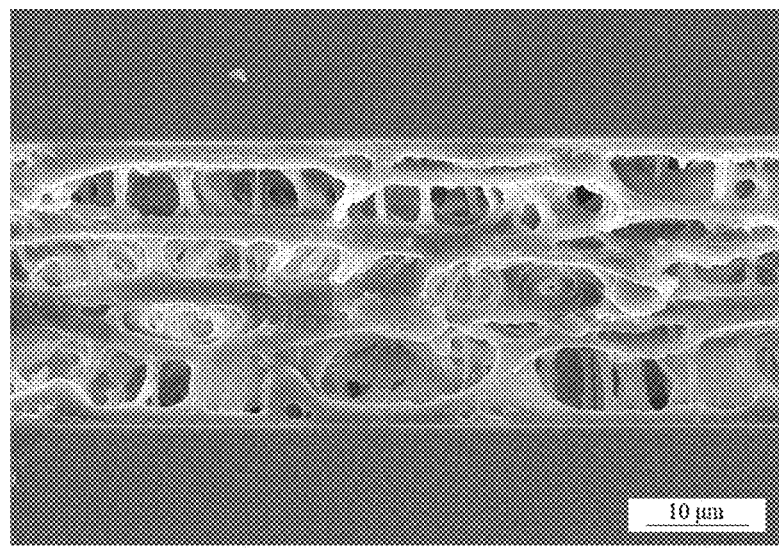
FIG. 10 is a scanning electron microscopy photo illustrating a microstructure of a liquid crystal/polymer composite electrically controlled dimming film having a porous polymer matrix and a vertically oriented polymer network according to some embodiments of the present disclosure.

As shown in FIG. 10, the liquid crystal/polymer composite electrically controlled dimming film obtained by the photo-thermal two-step polymerization in the embodiment 1 may construct the vertically oriented polymer networks in the pores of the porous microstructure, the vertical orientation effect of the polymer networks is good, and a large amount of the polymer networks exists in the polymer mesh.

TABLE 1

The proportion table of raw materials in the embodiment 1

| Raw material | Category | Name | Proportion/% |
|---|---|---|---|
| Liquid crystal material | Liquid crystal material | LC | 58.5 |
| First polymerizable monomer | Acrylate monomer 1 | HPMA | 16.8 |
| | Acrylate monomer 2 | LMA | 11.2 |
| | Acrylate monomer 3 | PEGDA600 | 4.2 |
| | Acrylate monomer 4 | Bis-EMA15 | 2.8 |
| First initiator | Photoinitiator | 651 | 0.3 |
| Second initiator | Thermal initiator | DMP-30 | 0.2 |
| Second polymerizable monomer | Rod-shaped epoxy monomer | E4M | 3.0 |
| | Rod-shaped thiol monomer | S4M | 3.0 |
| Spacer particle | Glass bead | glass bead with a diameter of 20 μm | 0.2 |

Embodiment 2

The photo-photo two-step polymerization is adopted in the embodiment 2. The name and proportion of the selected liquid crystal material, the first polymerizable monomer, the second polymerizable monomer, the first initiator, the second initiator, spacer particles are listed in Table 2, and the total mass of the mixture is 15 g. The materials in Table 2 are stirred at room temperature (25° C.) to form an isotropic liquid and mixed evenly, the mixture is sandwiched between two ITO conductive plastic films coated with indium tin oxide, and the mixture sandwiched between the two ITO conductive plastic films is rolled evenly to form a film. The area of the ITO conductive plastic film is 0.4*0.4 m². The first polymerization (photopolymerization) is performed by irradiating the film using ultraviolet light with a wavelength of 365 nm at room temperature, the intensity of the ultraviolet light is 5.0 mw/cm², and the irradiation time is within a range of 3~5 min. Subsequently, the second polymerization (photopolymerization) is performed by applying a voltage of 100 V to the film, and then irradiating the film using ultraviolet light with a wavelength of 254 nm under 25° C., the intensity of the ultraviolet light is 5.0 mw/cm², and the irradiation time is 30 min. Basis on this, the liquid crystal/polymer composite electrically controlled dimming film of the embodiment of the present disclosure is obtained.

The liquid crystal/polymer composite electrically controlled dimming film prepared by the embodiment 2 may be tested using a liquid crystal comprehensive tester to obtain the electro-optical curve shown in the solid circular curve in FIG. 9. The liquid crystal/polymer composite electrically controlled dimming film may be soaked in cyclohexane to remove liquid crystal material and then dried, and a scanning electron microscopy photo of the processed liquid crystal/polymer composite electrically controlled dimming film may be shown in FIG. 11.

As shown in FIG. 9, the solid circular curve is the electro-optical curve of the liquid crystal/polymer composite electrically controlled dimming film obtained in the embodiment 2, and the driving voltage of the electro-optical curve corresponding to the embodiment 2 may be about 25 V. When the voltage is 100 V, the transmittance of the liquid crystal/polymer composite electrically controlled dimming film may be 90%. The liquid crystal/polymer composite electrically controlled dimming film obtained in the embodiment 2 may have a lower driving voltage, but its transmittance is lower than that of the liquid crystal/polymer composite electrically controlled dimming film obtained in the embodiment 1 at the same voltage, indicating that the liquid crystal/polymer composite electrically controlled dimming film prepared by adopting the photo-thermal polymerization in the embodiment 1 has better electro-optical performance than that prepared by adopting the photo-photo polymerization in the embodiment 2.

Figure 11:
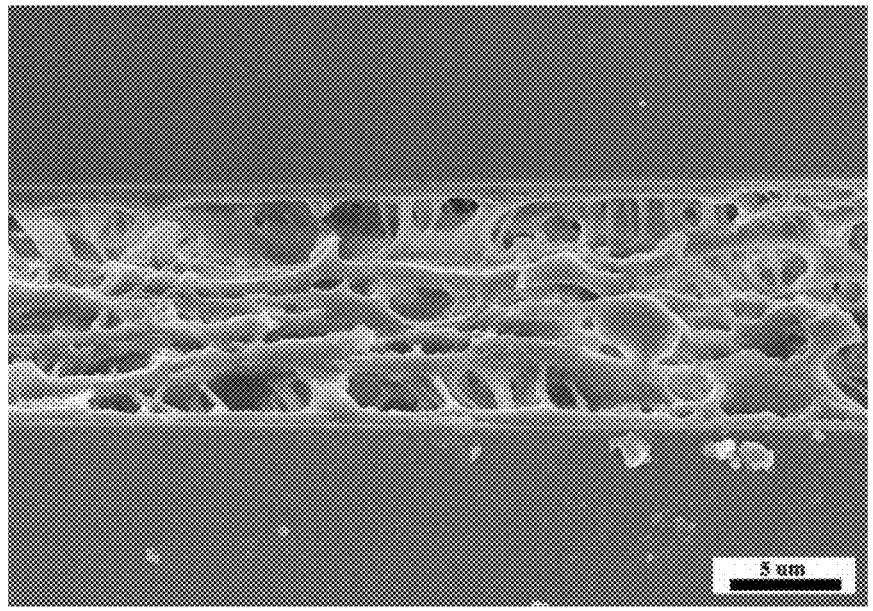
FIG. 11 is a scanning electron microscopy photo illustrating a microstructure of a liquid crystal/polymer composite electrically controlled dimming film having a porous polymer matrix and a vertically oriented polymer network according to some embodiments of the present disclosure.

As shown in FIG. 11, the liquid crystal/polymer composite electrically controlled dimming film obtained by adopting the photo-photo two-step polymerization in the embodiment 2 may construct the vertically oriented polymer networks in the pores of the porous microstructure.

TABLE 2

The proportion table of raw materials in the embodiment 2

| Raw material | Category | Name | Proportion/% |
|---|---|---|---|
| Liquid crystal material | Liquid crystal material | LC | 59.5 |
| First polymerizable monomer | Acrylate monomer 1 | HPMA | 16.8 |
| | Acrylate monomer 2 | LMA | 11.2 |
| | Acrylate monomer 3 | PEGDA600 | 4.2 |
| | Acrylate monomer 4 | Bis-EMA15 | 2.8 |
| First initiator | Radical initiator | 651 | 0.3 |
| Second initiator | Cationic initiator | UV6976 | 0.2 |
| Second polymerizable monomer | Rod-shaped epoxy monomer | E4M | 5.0 |
| Spacer particle | Glass bead | glass bead with a diameter of 20 μm | 0.2 |

Embodiment 3

The thermal-thermal two-step polymerization is adopted in the embodiment 3. The selected liquid crystal material, the first polymerizable monomer, the second polymerizable monomer, the initiator, name and proportion of spacer particles are listed in Table 3, and the total mass of the mixture is 15 g. The materials in Table 3 are stirred at room temperature (25° C.) to form an isotropic liquid and mixed evenly, and the mixture is sandwiched between two ITO conductive plastic films coated with indium tin oxide, and the mixture sandwiched between the two ITO conductive plastic films is rolled evenly to form a film. The area of the ITO conductive plastic film is 0.4*0.4 m². The first polymerization (thermal polymerization) is performed by placing the film in an oven at 50° C. for 1 h. Subsequently, the second polymerization (thermal polymerization) is performed by applying a voltage of 100 V to the film, and then placing the film in the oven at 80° C. for 5 h to obtain the liquid crystal/polymer composite electrically controlled dimming film in the embodiment of the present disclosure.

The liquid crystal/polymer composite electrically controlled dimming film prepared in the embodiment 3 may be tested using the liquid crystal comprehensive tester to obtain the electro-optical curve shown in the solid inverted triangle curve in FIG. 9. The liquid crystal/polymer composite electrically controlled dimming film may be soaked in cyclohexane to remove liquid crystal material and then dried, and a scanning electron microscopy photo of the processed liquid crystal/polymer composite electrically controlled dimming film may be shown in FIG. 12.

As shown in the solid inverted triangle curve in FIG. 9, the driving voltage of the electro-optical curve corresponding to the liquid crystal/polymer composite electrically controlled dimming film obtained in the embodiment 3 may be about 21 V. When the voltage is 100 V, the transmittance of the liquid crystal/polymer composite electrically controlled dimming film may be 97%. The liquid crystal/polymer composite electrically controlled dimming film obtained in the embodiment 3 has a lower driving voltage, which is lower than the driving voltage of the liquid crystal/polymer composite electrically controlled dimming film obtained in the embodiment 1 and embodiment 2, indicating that the liquid crystal/polymer composite electrically controlled dimming film obtained by adopting the thermal-thermal polymerization in the embodiment 3 has a better electro-optical property. However, in the practical production process, the photopolymerization step is more convenient and simpler than the thermal polymerization step. Considering comprehensively, it can be seen that the photo-thermal polymerization in the embodiment 1 is more suitable for practical industrial production than the thermal-thermal polymerization in the embodiment 3.

Figure 12:
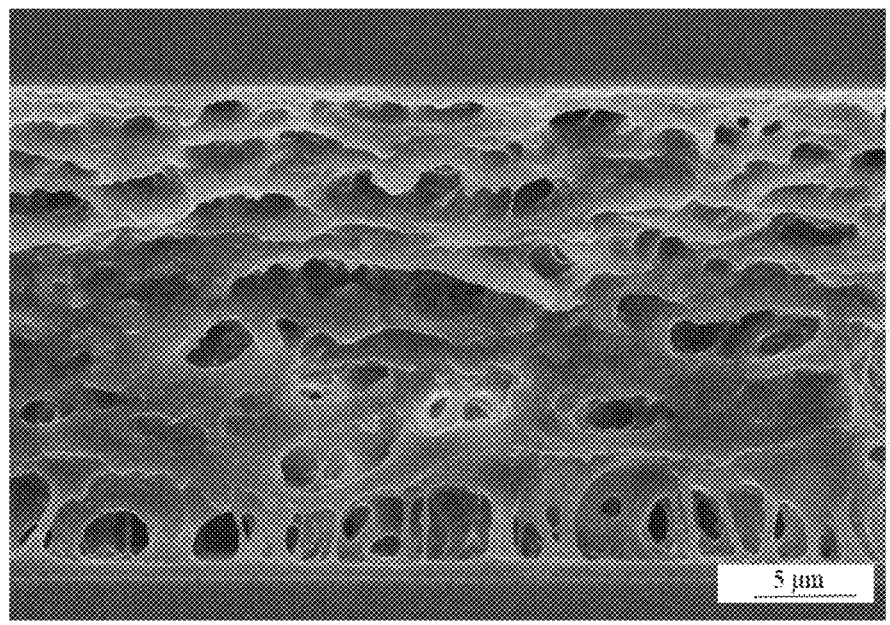
FIG. 12 is a scanning electron microscopy photo illustrating a microstructure of a liquid crystal/polymer composite electrically controlled dimming film having a porous polymer matrix and a vertically oriented polymer network according to some embodiments of the present disclosure.

As shown in FIG. 12, the liquid crystal/polymer composite electrically controlled dimming film obtained by adopting the thermal-thermal two-step polymerization in the embodiment 3 may construct the vertically oriented polymer networks in the pores of the porous microstructure.

TABLE 3

The proportion table of raw materials in the embodiment 3

| Raw material | Category | Name | Proportion/% |
|---|---|---|---|
| Liquid crystal material | Liquid crystal material | LC | 35.8 |
| First polymerizable monomer | Epoxy monomer 1 | NDGA | 4.1 |
| | Epoxy monomer 2 | PGDE | 12.3 |
| | Epoxy monomer 3 | E44 | 4.1 |
| | Epoxy monomer 4 | Capcure3800 | 39.0 |

TABLE 3-continued

The proportion table of raw materials in the embodiment 3

| Raw material | Category | Name | Proportion/% |
|---|---|---|---|
| Initiator | Thermal initiator | DMP-30 | 1.0 |
| Second polymerizable monomer | Rod-shaped epoxy monomer | E4M | 2.0 |
| | Rod-shaped thiol monomer | S4M | 2.0 |
| Spacer particle | Glass bead | glass bead with a diameter of 20 μm | 0.2 |

It should be noted that the preparation route of the embodiment 3 is the thermal-thermal two-step polymerization, and the first initiator and the second initiator used for two steps of thermal initiation polymerization may be the same initiator.

Comparative Embodiment 1

The name and the proportion ratio of the selected liquid crystal material, the acrylate monomer, the initiator, the glass microspheres are listed in Table 4, and the total mass of the mixture is 35 g. The materials in Table 4 are stirred at room temperature (25° C.) to form an isotropic liquid and are mixed evenly, the mixture is sandwiched between two ITO conductive plastic films coated with indium tin oxide, and the mixture is sandwiched between the two ITO conductive plastic films is rolled evenly to form a film. The area of the ITO conductive plastic film is 1*1 m². The film is irradiated by ultraviolet light with a wavelength of 365 nm at room temperature (25° C.) to obtain the composite film, the intensity of the ultraviolet light is 5.0 mW/cm², and the irradiation time is 10 min.

TABLE 4

The proportion table of raw materials in the comparative embodiment 1

| Category | Name | Proportion/% |
|---|---|---|
| Liquid crystal material | LC | 64.7 |
| Acrylate monomer 1 | HPMA | 16.8 |
| Acrylate monomer 2 | LMA | 11.2 |
| Acrylate monomer 3 | PEGDA600 | 4.2 |
| Acrylate monomer 4 | Bis-EMA15 | 2.8 |
| Initiator | 651 | 0.3 |
| Glass bead | glass bead with a diameter of 20 μm | 0.2 |

The composite material film prepared by the comparative embodiment 1 may be tested using the liquid crystal comprehensive tester to obtain the electro-optical curve as shown in the solid square curve of FIG. 9.

As shown in FIG. 9, the square curve is the electro-optical curve of the liquid crystal/polymer composite electrically controlled dimming film prepared in the comparative embodiment 1, and the driving voltage of the electro-optical curve corresponding to comparative embodiment 1 may be about 27 V. When the voltage is 100 V, the transmittance of the liquid crystal/polymer composite electrically controlled dimming film may be 75%. As shown in FIG. 9, by comparing the embodiments 1, 2, and 3 with the comparative embodiment 1, it can be seen that the driving voltages of the embodiments 1, 2 and 3 are significantly lower than that of the comparative embodiment 1, indicating that some material in some embodiments of the present disclosure have a better reduction effect on the driving voltage of the composite electrically controlled dimming film.

Comparative Embodiment 2

The photo-thermal two-step polymerization is adopted in the comparative embodiment 2. The name and proportion of the selected liquid crystal material, the first polymerizable monomer, the second polymerizable monomer, the first initiator, the second initiator, spacer particles are listed in Table 5, and the total mass of the mixture is 15 g. The materials in Table 1 are stirred at room temperature to form an isotropic liquid and are mixed evenly, and the mixture is sandwiched between two ITO conductive plastic films coated with indium tin oxide, and the mixture sandwiched between the two ITO conductive plastic films is rolled evenly to form a film. The area of the ITO conductive plastic film is 0.4*0.4 m². The first polymerization (photopolymerization) is performed by irradiating the film using ultraviolet light with a wavelength of 365 nm at the room temperature, the intensity of the ultraviolet light is 5.0 mw/cm², and the irradiation time is 10 min. Subsequently, the second polymerization (thermal polymerization) is performed by applying a voltage of 100 V to the film, and then placing the film in an oven at 70° C. for 5 h obtain the liquid crystal/polymer composite electrically controlled dimming film in the embodiment of the present disclosure.

Figure 13:
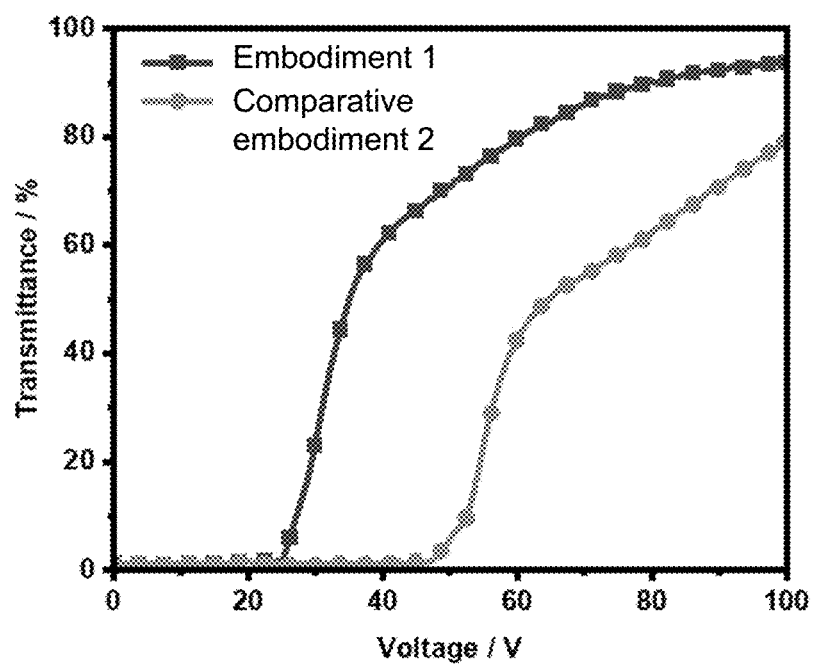
FIG. 13 is an electro-optical curve illustrating a liquid crystal/polymer composite electrically controlled dimming film according to some embodiments of the present disclosure.

The liquid crystal/polymer composite electrically controlled dimming film prepared in the comparative embodiment 2 may be tested by a liquid crystal comprehensive tester to obtain the electro-optical curve as shown in the solid square curve in FIG. 13. The liquid crystal/polymer composite electrically controlled dimming film may be soaked in cyclohexane to remove the liquid crystal material and then dried, and a scanning electron microscopy photo of the processed liquid crystal/polymer composite electrically controlled dimming film may be shown in FIG. 14.

TABLE 5

The proportion table of raw materials in the comparative embodiment 2

| Raw material | Category | Name | Proportion/% |
|---|---|---|---|
| Liquid crystal material | Liquid crystal material | LC | 58.5 |
| First polymerizable monomer | Acrylate monomer 1 | HPMA | 16.8 |
| | Acrylate monomer 2 | LMA | 11.2 |
| | Acrylate monomer 3 | PEGDA600 | 4.2 |
| | Acrylate monomer 4 | Bis-EMA15 | 2.8 |
| First initiator | Photoinitiator | 651 | 0.3 |
| Second initiator | Thermal initiator | DMP-30 | 0.2 |
| Second polymerizable monomer | Rod-shaped epoxy monomer | E4M | 3.0 |
| | Non-rod-shaped thiol monomer | Capcure3800 | 3.0 |
| Spacer particle | Glass bead | glass bead with a diameter of 20 μm | 0.2 |

In FIG. 13, the abscissa is the voltage value, and the ordinate is the transmittance of the liquid crystal/polymer composite electrically controlled dimming film. As shown in the solid square curve in FIG. 13, the driving voltage of the electro-optical curve corresponding to the embodiment 1 may be about 25 V. When the voltage is 100 V, the transmittance of the liquid crystal/polymer composite electrically controlled dimming film may be 94%. As shown in the solid circular curve in FIG. 13, the driving voltage of the electro-optical curve corresponding to the comparative embodiment 2 may be about 43 V. When the voltage is 100 V, the transmittance of the liquid crystal/polymer composite electrically controlled dimming film may be 80%.

Comparing the embodiment 1 and the comparative embodiment 2, according to FIG. 13, it can be seen that the driving voltage of the composite electrically controlled dimming film prepared in the embodiment 1 is significantly lower than the driving voltage of the composite electronic control dimming film prepared in the comparative embodiment 2. Therefore, compared with the second polymerizable monomer in the comparative embodiment 2 only partially including the rod-shaped monomers (i.e., including the rod-shaped epoxy monomer and the non-rod-shaped thiol monomer), the second polymerization monomer in the embodiment 1 all including the rod-shaped monomers (i.e., rod-shaped epoxy monomers and rod-shaped mercaptan monomers) has a better effect on reducing the driving voltage of the composite electrically controlled dimming film.

Figure 14:
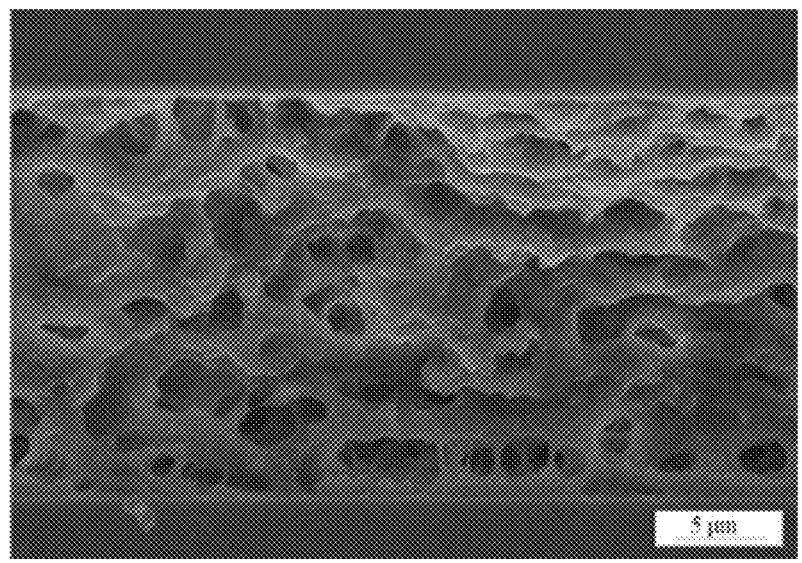
FIG. 14 is a scanning electron microscopy photo illustrating a microstructure of a liquid crystal/polymer composite electrically controlled dimming film having a porous polymer matrix and a vertically oriented polymer network according to some comparative embodiments of the present disclosure.

Comparing FIG. 14 corresponding to the comparative embodiment 2 with FIG. 10 corresponding to the embodiment 1, in the comparative embodiment 2, the liquid crystal/polymer composite electrically controlled dimming film is obtained using the second polymerizable monomer including the rod-shaped epoxy monomer and the non-rod-shaped thiol monomer, which cannot construct a large amount of vertically oriented polymer networks well. It shows that the composite electrically controlled dimming film is obtained using rod-shaped epoxy monomer and rod-shaped thiol monomer as the second polymerizable monomer (i.e., the second polymerizable monomers are all rod-shaped monomers) in the photo-thermal polymerization, which have a lower driving voltage and better electro-optical performance due to constructing a large amount of the vertically oriented polymer networks with a better orientation.

As can be seen from the above, the rod-shaped epoxy monomer and the non-rod-shaped thiol monomer are used during the second-step polymerization in the comparative embodiment 2, and the small amount of the vertically oriented polymer networks are formed, which causes a reduced role in helping the orientation of the liquid crystal molecules, thus being not able to reduce the driving voltage well enough to make its driving voltage higher than the driving voltage of the embodiment 1. In the embodiment 1, the rod-shaped epoxy monomer and the rod-shaped thiol monomer are combined in the second-step polymerization, these two monomers are not initiated in the first-step ultraviolet light polymerization, but fully react in the second-step thermal polymerization, thereby forming a large amount of the vertically oriented polymer networks with a better orientation. These vertically oriented polymer networks reduce the collective anchoring force of the polymers on liquid crystal molecules when the liquid crystal molecules align with the direction of the electric field during the power-on process of the dimming film, so as to reduce the driving voltage, causing that the composite electrically controlled dimming film prepared in the embodiment 1 has a good electro-optical performance.

The existing liquid crystal/polymer composite dimming film preparation technology is sometimes a separate one-step polymerization method, such as the ultraviolet light polymerization or the thermal polymerization. On the one hand, the PDLC porous polymer matrix, which is constructed by the one-step method, may have a large anchoring force on the orientation of liquid crystal molecules, thus increasing the driving voltage required for the optical state transition of the film, which is not conducive to practical application. On the other hand, the preparation process and control means of the separate one-step method may be relatively simple, which is not conducive to the regulation of the microscopic morphology of the composite dimming film.

The liquid crystal/polymer composite dimming film preparation method of some embodiments of the present disclosure adopts the two-step polymerization method. The polymer matrix similar to the porous microstructure of the PDLC in the prior art is firstly constructed by the first-step polymerization reaction, and then the vertically oriented polymer networks in the pores of the porous microstructure are constructed through the second-step polymerization reaction, thereby realizing a unique composite microstructure. On the one hand, the composite microstructure may effectively reduce the anchoring force of the polymer matrix to the orientation of liquid crystal molecules, thereby reducing the driving voltage of the film. On the other hand, the preparation process and control mean of the two-step polymerization method may be more abundant, and the composite microstructure of the film may be regulated by changing the polymerization condition and polymerization process in more detail and effectively.

In addition, the first-step polymerization reaction and the second-step polymerization reaction in the two-step polymerization method of the liquid crystal/polymer composite dimming film of some embodiments of the present disclosure may separately use different polymer monomer material systems. For example, in the photo-thermal two-step polymerization, the first polymerizable monomer of the photopolymerization may be a radical photopolymerizable monomer or a cationic photopolymerizable monomer, and the second polymerizable monomer of the thermal polymerizable may be a rod-shaped thermally polymerizable monomer. Therefore, in the first-step photopolymerization, the second polymerizable monomer may not participate in the reaction, which may ensure that the first-step polymerization is separated from the second-step polymerization. On the basis, by controlling the polymerization condition of the first-step polymerization (the intensity of ultraviolet light, irradiation time, etc.), the first polymerizable monomer may be fully reacted, and the performance of the film may not be damaged by the small molecule monomer remaining in the system. At the same time, the second polymerizable monomer may not participate in the first-step polymerization, which ensures that the porous polymer matrix formed after the first-step polymerization may not contain rod-shaped or liquid crystal monomer molecules, that is, the porous polymer matrix has a lower anchoring force to liquid crystal molecules and has a better effect on reducing the driving voltage.

Having thus described the basic concepts, it may be rather apparent to those skilled in the art after reading this detailed disclosure that the foregoing detailed disclosure is intended to be presented by way of example only and isn't limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

What is claimed is:

1. A liquid crystal/polymer composite electrically controlled dimming film, comprising:
   a liquid crystal material, a polymer matrix, and two layers of conductive substrates, wherein
   the polymer matrix is sandwiched between the two layers of conductive substrates, and the polymer matrix has a porous microstructure;

the liquid crystal material is dispersed in the polymer matrix to form liquid crystal microdroplets, and the liquid crystal microdroplets have vertically oriented polymer networks;

the polymer matrix is prepared by photopolymerization based on a radical photopolymerizable monomer;

the polymer network is prepared by thermal polymerization based on a rod-shaped thermally polymerizable monomer capable of aligning with molecules of the liquid crystal material along a direction of an electric field, wherein the radical photopolymerizable monomer is one or more of acrylate monomers or vinyl monomers that is capable of being radically polymerized under irradiation of ultraviolet light; and the rod-shaped thermally polymerizable monomer is a mixture of epoxy monomers and thiols or amine monomers or a mixture of monomers containing an amino, a hydroxyl, a carboxyl, or a mercapto and isocyanate monomers that is capable of being thermally polymerized under a heating condition.

2. The liquid crystal/polymer composite electrically controlled dimming film according to claim 1, wherein the liquid crystal material is a cholesteric liquid crystal material with positive dielectric anisotropy, a nematic liquid crystal, a smectic liquid crystal, or a liquid crystal material with a smectic phase-cholesteric phase transformation characteristic.

3. The liquid crystal/polymer composite electrically controlled dimming film according to claim 1, wherein the liquid crystal material includes one or more of a molecular structure (1):

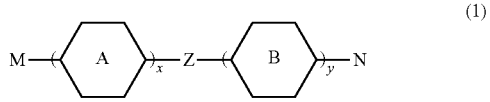

(1)

wherein M and N are an alkyl group containing 1-20 carbon atoms, or an alkoxy group containing 1-20 carbon atoms, or a siloxane group containing 1-20 atoms, a cyan group, an ester group, halogen, isothiocyanate, or nitro; A and B are aromatic rings or alicyclic alkanes containing at least one of a benzene ring, a six-membered ring, a six-membered heterocyclic ring, a five-membered ring, a five-membered heterocyclic ring, a biphenyl, a terphenyl, a naphthalene ring, A and B are connected by a covalent bond or a linking group Z; A and B contain side groups or do not contain side groups, and the side groups are halogen, cyan group, or methyl; x and y are separately 0-4; and Z is an ester group, an alkynyl group, an alkane group, a nitrogen-nitrogen double bond, or an ether bond.

4. The liquid crystal/polymer composite electrically controlled dimming film according to claim 1, wherein a pore size of micropores in the polymer matrix is within a range of 0.1 micron-100 microns.

5. The liquid crystal/polymer composite electrically controlled dimming film according to claim 1, wherein the conductive substrate includes a conductive film or a glass substrate containing metal compounds including Indium tin oxide (ITO), silver, and aluminum.

6. A liquid crystal/polymer composite electrically controlled dimming film preparation method, comprising:

mixing a liquid crystal material, a first polymerizable monomer, a second polymerizable monomer, a first initiator, a second initiator, and a spacer particle to obtain a uniform mixture, wherein the first polymerizable monomer is a radical photopolymerizable monomer, and the second polymerizable monomer is a rod-shaped thermally polymerizable monomer capable of aligning with molecules of the liquid crystal material along a direction of an electric field;

filling the mixture between two layers of laminated conductive substrates to prepare a film, forming a polymer matrix with a porous microstructure through a first reaction, and dispersing the liquid crystal material in the polymer matrix in a form of liquid crystal microdroplets; and applying an electric field to the film to vertically align molecules of the liquid crystal material and molecules of the second polymerizable monomer, and forming vertically oriented polymer networks in the liquid crystal microdroplets through a second reaction to obtain the liquid crystal/polymer composite electrically controlled dimming film; wherein the radical photopolymerizable monomer is one or more of acrylate monomers or vinyl monomers that is capable of being radically polymerized under irradiation of ultraviolet light; and the rod-shaped thermally polymerizable monomer is a mixture of epoxy monomers and thiols or amine monomers or a mixture of monomers containing an amino, a hydroxyl, a carboxyl, or a mercapto and isocyanate monomers that is capable of being thermally polymerized under a heating condition.

7. The liquid crystal/polymer composite electrically controlled dimming film preparation method according to claim 6, wherein the first reaction includes the first initiator initiating the radical photopolymerizable monomer; the second reaction includes the second initiator initiating a thermal polymerization reaction of the rod-shaped thermally polymerizable monomer.

8. The liquid crystal/polymer composite electrically controlled dimming film preparation method according to claim 6, wherein the liquid crystal material, the first polymerizable monomer, and the second polymerizable monomer are 10.0-95.0 parts by weight, 5.0-80.0 parts by weight, and 0.1-40.0 parts by weight, respectively.

* * * * *